US008734214B2

(12) United States Patent
Hughes et al.

(10) Patent No.: US 8,734,214 B2
(45) Date of Patent: May 27, 2014

(54) SIMULATION OF SPORTING EVENTS IN A VIRTUAL ENVIRONMENT

(75) Inventors: Ian Hughes, Southampton (GB); Bradford Glenn Kasell, Williamstown (AU); Christopher Beng Kiat Yeoh, Braddon (AU); Kelly Yeoh, Braddon (AU)

(73) Assignee: International Business Machines Corporation, Armonk, NY (US)

( * ) Notice: Subject to any disclaimer, the term of this patent is extended or adjusted under 35 U.S.C. 154(b) by 1685 days.

(21) Appl. No.: 11/947,045

(22) Filed: Nov. 29, 2007

(65) Prior Publication Data

US 2009/0143124 A1   Jun. 4, 2009

(51) Int. Cl.
*A63F 7/06* (2006.01)

(52) U.S. Cl.
USPC ............................................................ 463/3

(58) Field of Classification Search
USPC ............................................................ 463/5, 3
See application file for complete search history.

(56) References Cited

U.S. PATENT DOCUMENTS

| 5,221,082 | A * | 6/1993 | Curshod ........................ 473/199 |
| 6,095,928 | A * | 8/2000 | Goszyk .......................... 473/222 |
| 6,320,173 | B1 * | 11/2001 | Vock et al. ................. 250/206.1 |
| 7,094,164 | B2 * | 8/2006 | Marty et al. ................... 473/416 |
| 7,321,330 | B2 * | 1/2008 | Sajima et al. .................... 342/59 |
| 7,351,150 | B2 * | 4/2008 | Sanchez .......................... 463/42 |
| 7,544,137 | B2 * | 6/2009 | Richardson .................... 473/415 |
| 7,788,071 | B2 * | 8/2010 | Bond et al. ......................... 703/6 |
| 2002/0122115 | A1 * | 9/2002 | Harmath ....................... 348/157 |
| 2003/0073518 | A1 * | 4/2003 | Marty et al. .................. 473/416 |
| 2005/0023763 | A1 * | 2/2005 | Richardson .................... 273/348 |
| 2005/0227792 | A1 * | 10/2005 | McCreary et al. ............ 473/409 |
| 2005/0233815 | A1 * | 10/2005 | McCreary et al. ............ 473/131 |
| 2005/0256895 | A1 * | 11/2005 | Dussault ........................ 707/102 |
| 2005/0272516 | A1 * | 12/2005 | Gobush ......................... 473/200 |
| 2006/0046807 | A1 * | 3/2006 | Sanchez ............................ 463/9 |
| 2006/0063574 | A1 * | 3/2006 | Richardson et al. ............. 463/1 |
| 2006/0149516 | A1 * | 7/2006 | Bond et al. ......................... 703/6 |
| 2007/0021242 | A1 * | 1/2007 | Krickler ......................... 473/451 |
| 2007/0238539 | A1 * | 10/2007 | Dawe et al. .................... 473/131 |
| 2007/0265048 | A1 * | 11/2007 | Winsick ............................ 463/9 |
| 2008/0182685 | A1 * | 7/2008 | Marty et al. ................... 473/407 |
| 2008/0200287 | A1 * | 8/2008 | Marty et al. ................... 473/459 |
| 2008/0268929 | A1 * | 10/2008 | Billmaier et al. ................. 463/4 |
| 2008/0312010 | A1 * | 12/2008 | Marty et al. ................... 473/447 |
| 2010/0210361 | A1 * | 8/2010 | Crawford et al. ............... 463/36 |

\* cited by examiner

*Primary Examiner* — Seng H Lim
(74) *Attorney, Agent, or Firm* — Roy W. Truelson

(57) ABSTRACT

Aspects of the present invention provide a system, method and computer program product for simulating movement of a projectile in a virtual environment. Primary data comprising a plurality of sets of position values and a plurality of time values for a projectile is received, with each time value in the primary data being associated with one of the sets of position values. The primary data is processed to generate secondary data that represents at least two consecutive sets of positions. Each set of positions includes a start position and an end position for the projectile, and the secondary data further represents a velocity of the projectile associated with each start position. The secondary data is used to simulate movement of the projectile in the virtual environment.

19 Claims, 5 Drawing Sheets

SIMULATION OF SPORTING EVENTS IN A VIRTUAL ENVIRONMENT

FIELD OF THE INVENTION

The present invention relates to virtual environments, and more particularly to simulation of projectiles in sporting events in a virtual environment.

BACKGROUND OF THE INVENTION

In recent years, the popularity of viewing sporting events and other activities via the Internet has increased dramatically. It is now possible to view entire sporting events with online streaming video, whether pre-recorded or substantially live (i.e. live or with a slight delay).

However, many sporting events find at least part of their appeal in their technicality. For example, in baseball, an observer may be interested in whether an umpire's call of a ball or strike is correct. Similarly, in cricket, many enthusiasts are interested in the technicalities of how a wicket was lost, in particular by leg-before-wicket (LBW) or whether a bat actually struck a ball. As a result, significant technological efforts have been made to feed this interest. These involve high-speed camera systems such as Hawk-Eye™ to track a path of a ball and heat sensitive camera systems that will scan a bat for heat spots to determine whether or not a ball was struck. The Hawk-Eye system is a product of Hawk-Eye Innovations Ltd., which has an address at Unit C, The Apex Centre, Church Lane, Colden Common, Winchester, SO21 1TN.

In tennis, the Hawk-Eye system and others have been used to entertain viewers and also in some instances to decide whether or not a point has been scored.

Such systems can feed a series of images via image processing equipment to television viewers so that they can follow a path of a ball.

At this stage, however, the viewer's involvement is determined by the systems provided by the broadcasters, be they Internet-based or television-based. This can be frustrating for enthusiasts who may wish to view a particular play from a certain angle where such a view is not capable of being provided by such systems.

Recently, computer-based immersive virtual environments called "virtual worlds" have become popular. One prominent current example of a virtual world is "Second Life" by Linden Labs, 1100 Sansome Street, San Francisco, Calif. 94111. Other virtual worlds include "There", which is operated by Makena Technologies, Inc., which has an office at 1825 South Grant Street, Suite 450, San Mateo, Calif. 94402, and "Entropia Universe", a continuation of "Project Entropia", operated by MindArk PE AB which has an address of Jarntorget 8, SE 413 04, Gothenburg, Sweden. A particular advantage of using such virtual environments is that they allow avatars to "participate" in activities. Thus, it would be possible for a user, represented by his or her avatar, to move around a virtual sporting locale during a simulation of a sporting activity.

SUMMARY OF THE INVENTION

In one aspect, the present invention is directed to a method of simulating movement of a projectile in a virtual environment. According to the method, primary data comprising a plurality of sets of position values and a plurality of time values for a projectile is received, with each time value being associated with one of the sets of position values. The primary data is processed to generate secondary data which represents at least two consecutive sets of positions, each set of positions comprising a start position and an end position for the projectile. The secondary data further represents a velocity of the projectile associated with each start position. The secondary data is used to simulate movement of the projectile in the virtual environment.

In an embodiment, receiving the primary data comprises receiving a primary data stream of the position values and associated time values from a monitoring system in a real world environment.

In an embodiment, processing the primary data to generate the secondary data comprises determining redirection spaces for the projectile. In one particular embodiment, each redirection space consists of a single collision point at which a direction of the projectile changes to an extent that indicates a collision of the projectile with an object. In this embodiment, processing the primary data to generate the secondary data comprises calculating velocity vectors between consecutive collision points.

In an embodiment, using the secondary data to simulate movement of the projectile in the virtual environment comprises, in series, for each consecutive set of positions, creating a new virtual projectile at the start position in the virtual environment, with the new virtual projectile having the velocity associated with the start position, and then deleting the new virtual projectile when it reaches the end position in the virtual environment.

In one embodiment, each position that is the end position in a first set of positions is also the start position in the next consecutive set of positions, so that the consecutive sets of positions represented by the secondary data overlap one another. In an alternative embodiment, each position that is the end position in a first set of positions is distinct from the start position in a next consecutive set of positions.

In another aspect, the present invention is directed to a method for simulating projectile movement in a virtual environment. Data is obtained which represents at least two consecutive sets of positions, with each set of positions comprising a start position and an end position for a projectile. The data further represents a velocity of the projectile associated with each start position. The data is used to, in series, for each consecutive set of positions, create a new virtual projectile at the start position, with the new virtual projectile having the velocity associated with the start position, and delete the new virtual projectile when it reaches the end position.

Embodiments of the invention are now described with reference to the accompanying drawings. The following description is intended only for illustrative purposes and is not intended to limit the scope of the invention in any way.

DETAILED DESCRIPTION

Some virtual environments (i.e. virtual worlds) that are presently available are configured to permit subscribers or users to upload script to achieve various effects. Aspects of the invention take advantage of this characteristic of such environments to upload scripts to generate the simulation. Since the environments are immersive, it is possible for users to move about the environments as "avatars" (similar to a player in a three-dimensional video game) so that features of the environment can be viewed from the perspective of the avatar. As a result, by use of aspects of the present invention, a simulation of (for example) a sporting event within a virtual world can be viewed from perspectives that can significantly enhance the viewing experience. This is particularly so given the development speed of animation technology.

Figure 1:
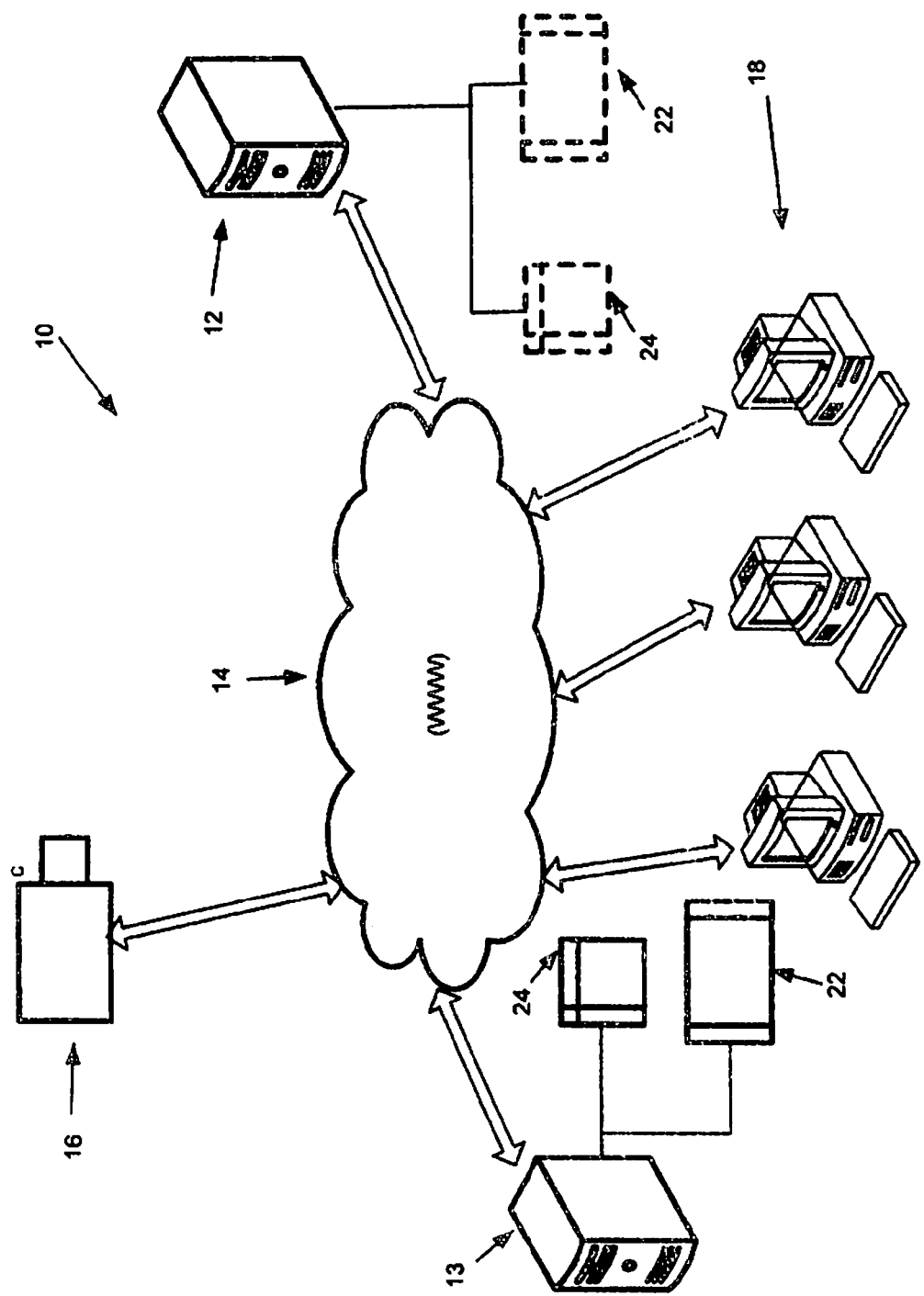
FIG. 1 shows an embodiment of an exemplary system, in accordance with an aspect of the present invention, for simulating projectile movement in a virtual environment.

In FIG. 1, reference numeral 10 generally indicates an exemplary system, all or part of which may be used in association with aspects of the present invention for simulating a projectile in a virtual environment.

In broad terms, the system 10 supports simulation of movement of a projectile in a virtual environment so that a user or subscriber can be immersed in the activity, with the movement of the projectile being based on data obtained from outside the virtual environment. In other words, the user, represented by an avatar, can move about a simulation of a location in which the projectile movement takes place to "observe" the movement of the projectile from different points of view. With virtual platforms presently available, it would be possible for a user to fix his or her avatar with respect to a dynamic virtual object (i.e. a virtual object that moves during the simulation).

In order to more fully explain aspects of the present invention, a sporting event, and in particular a tennis match, will be used as an illustrative example of projectile movement being simulated. Thus, the projectile whose movement is to be simulated is the tennis ball. However, one skilled in the art will appreciate, once informed by the herein disclosure, that aspects of the present invention may be used to simulate other sporting events such as (but not limited to) baseball, soccer, football, basketball, bowling, archery or cricket, and will also appreciate that the applications of the invention extend beyond sporting events to include other types of projectile movement.

As is known, sporting events that involve high projectile speeds often use a number of high speed cameras to capture a series of images so that a path of the ball can be generated. Usually, the purpose is to enhance the remote viewer's experience. However, in some cases, the cameras, together with suitable processing equipment, are used to assist judges and referees in the decision making process. For example, a system known as Hawk-Eye (noted above) is used in tennis. The processing equipment of Hawk-Eye is capable of generating a stream of position and time pairs corresponding to each image of the ball captured by the cameras. For ease of reference, that stream will be referred to as a "primary data stream", and the data therein is primary data.

The system 10 processes the primary data into a form suitable for use in a virtual environment. The processing is facilitated by the fact that each position in the primary data is associated with a particular time value. Thus, by making acceptable assumptions, such as wind resistance being zero, it is possible to calculate velocity vector components associated with locations at which a projectile, such as a ball, begins a new movement path. The spatial location where a projectile begins a new movement path is referred to herein as a redirection space. Typically, redirection spaces represent points at which the projectile whose movement is to be simulated has collided with another object, and in such instances a redirection space may comprise a single collision point. Accordingly, compressed data reflecting projectile speed and position can be uploaded to the virtual environment in which movement of the projectile is to be simulated. More particularly, only points representing redirection spaces, such as collision points, and the velocity associated with the projectile at those points, are necessary to simulate the trajectories of the projectile.

An example of a suitable virtual environment is that known as Second Life, as mentioned above. As is known, Second Life is an Internet-based virtual environment which was developed by Linden Labs and initially made available in 2002 to users that had content creation experience. The beta version was made available in 2003.

Second Life is one of the most mature virtual platforms presently available at time of filing for business-oriented systems. The Second Life servers are known as a "grid" that represents a "world" divided into areas of "land" called "regions", each of which is simulated by a single server. Users or subscribers interact with the Second Life world and with each other via a "viewer" or "client" installed on the subscriber's computer.

The Second Life server makes a 3D modeling tool available to subscribers (called "Residents") who create most of the content in the Second Life world. This content includes Resident avatars that can move around in the Second Life world as representatives of the Residents. The avatars have a wide range of movement, including "flight".

The 3D modeling tool also allows Residents to build Second Life objects such as buildings, landscape, vehicles, furniture and machines. It is also possible for Residents to create various graphics, animations and sound tools and upload them into the Second Life virtual world.

The Second Life objects can be provided with movement and can also interact with other Second Life objects depending on the characteristics with which they have been programmed. This is made possible by the Second Life script, which includes subprograms that can call library functions which can utilize a physics engine referred to as the Second Life physics engine. The Second Life physics engine carries out the necessary calculations so that the script can render movement of a Second Life object resulting from an initial velocity imparted to the Second Life object.

The calculations can be carried out by the Second Life physics engine so that the movement of the Second Life object appears to act under the influence of gravity and the initial velocity. Second Life objects can also be programmed to act under arbitrary continuous forces. For example, a constant force opposed to gravity can be applied.

The use of Second Life as an illustrative virtual world in respect of which aspects of the present invention may be applied is intended to be exemplary only. One skilled in the art, once informed by the herein disclosure, will appreciate that aspects of the present invention may be applied in respect of any virtual world that uses a vector-based physics engine.

Presently available platforms, such as Second Life, make it possible for subscribers to write scripts and upload them into the Second Life environment for the purposes of achieving desirable effects such as specialized movement and sound. In addition, Second Life has support for communication between Second Life objects. Thus, text strings can be sent and received or listened for on specific channels.

Due to the large volume of data that would be generated by a monitoring system such as Hawk-Eye, it is advantageous to perform certain pre-calculations to reduce the data volume so as to facilitate rendering of a projectile simulation, such as a tennis match or part thereof, using the Second Life script. As will be understood more fully by reference to the exemplary embodiments described herein, aspects of the present invention have the inherent benefit of effectively carrying out such data compression.

The system 10 includes a data receiving module in the form of a web server 12 in communication with the World Wide Web (WWW) 14 (although other computer networks may also be used in other embodiments). The web server 12 is programmed with at least part of an embodiment, in accordance with aspects of the invention, of a computer program product to communicate with image processing equipment 16 of a game monitoring system to receive the primary data stream from the image processing equipment 16. Alternatively, the primary data stream may be previously generated primary data, and in some instances the primary data may not originate from an actual real world event, but may instead be generated from arbitrary data. For example, primary data may be generated from a reconstruction of ballistic data from an alleged criminal incident, so that aspects of the present invention may be applied to simulate projectile movement for use in a fact-finding or trial process. Alternatively, primary data may be generated from data obtained from analysis of television recordings to recreate a historical sporting event at which suitable image processing apparatus was not present. For example, it may be desired to recreate the victory of the United States Olympic Hockey Team over the Russian team at the 1980 Winter Olympics so that participants in a virtual environment could experience that game from various perspectives.

Both the server 12 and the simulation server 13 can be configured to process the primary data into secondary data in a form suitable for use by a simulation module, such as a simulation module defined by the simulation server 13, running a simulation script.

Thus, an embodiment, in accordance with an aspect of the invention, of a computer program product for simulating a projectile in a virtual environment can be enabled on both the server 12 and the simulation server 13.

It should be noted that reference is made here to a single simulation server 13. However, it is to be understood that any number of servers can be provided and represented by the server 13. Use of the singular in this case is simply for the purpose of convenience of description and should not be regarded as limiting in any way.

The system 10 further includes any number of computing devices 18 capable of communicating with the web server 12 and the simulation server 13 via the World Wide Web 14. The computing devices 18 are used by subscribers or viewers to view, in an immersive manner, a simulation involving a projectile.

For the purposes of the following description, the simulation server 13 is programmed to process the primary data. Thus, in this particular embodiment, the server 13 is programmed with at least part of a computer program product 22 according to an aspect of the present invention, so as to enable the simulation server 13 to effectively prepare secondary data for use by the simulation script. The secondary data is typically compressed relative to the primary data, and can then be stored by the server 13 at 24 for use by the rendering computer program with which the simulation server 13 has been programmed.

The secondary data can alternatively be generated by the web server 12, as indicated by dashed lines in FIG. 1.

The web server 12 is programmed to retrieve a primary data stream from (for example) the image processing equipment 16 via, for example, the World Wide Web 14 or any other suitable data connection. That primary data stream is then communicated to the simulation server 13 to be used by the relevant portion of the computer program product 22 which identifies key data sets, such as those representing characterized changes of direction. It is to be appreciated that the changes of direction with predetermined characteristics would represent redirection spaces, such as an impact with a tennis racket, a playing surface or the net. The relevant portion of the computer program product 22 carries out a pre-calculation with the redirection spaces and their associated time values to return secondary data suitable for uploading to the simulation script, as will be explained further below.

The secondary data is then uploaded to the simulation script so that the secondary data can be used by a physics engine for the virtual environment. For example, the Second Life script uses the Second Life physics engine and various subprograms for rendering projectile movement, which enables simulation of (for example) a sporting event or part thereof in a Second Life environment. Thus, users or subscribers to Second Life can view at least parts of the sporting event with the devices 18. The sporting event being simulated may be a sporting event which actually occurred in the real world, such as a tennis match captured by the Hawk-Eye system.

Figure 2:
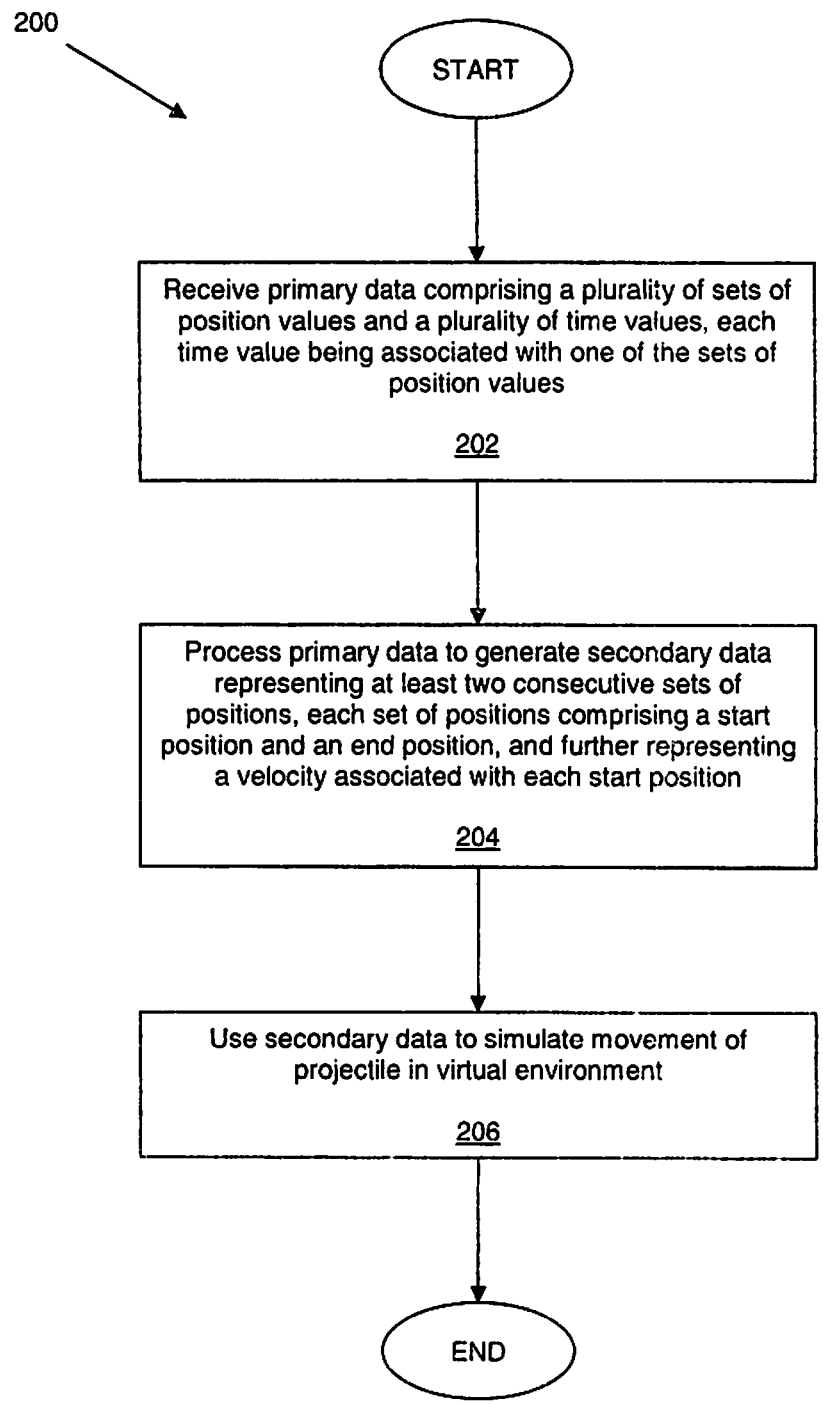
FIG. 2 shows a flowchart representing a method, which may be implemented by a computer program product, in accordance with an aspect of the present invention, for simulating projectile movement in a virtual environment.

With reference now to FIG. 2, a method of simulating a projectile in a virtual environment according to an aspect of the present invention is shown generally at 200. The method 200 may be enabled by an embodiment, also in accordance with aspects of the present invention, of a computer program product.

At step 202, the method 200 receives primary data. As noted above, the primary data may be obtained in the form of a primary data stream from image processing equipment such as the Hawk-Eye system, or may be obtained from another source. For example, primary data may be obtained from a GPS receiver within a projectile which transmits positional data. The primary data comprises a plurality of sets of position values and a plurality of time values, with each time value being associated with one of the sets of position values. Typically, the primary data will be represented as Cartesian coordinates in the form ($Px_i$, $Py_i$, $Pz_i$, $Pt_i$), where $Px_i$ represents a position of the projectile relative to an x-axis, $Py_i$ represents a position of the projectile relative to a y-axis and $Pz_i$ represents a position of the projectile relative to a z-axis, so that $Px_i$, $Py_i$ and $Pz_i$ form a set of position values that completely represent the position of the projectile at point i. Each value of $Pt_i$ represents the time value associated with the set of position values $Px_i$, $Py_i$ and $Pz_i$, that is, the time at which the projectile occupied that position.

Movement of the projectile may be conceptually broken down into smaller segments, and such segments may advantageously be based on an activity with which the projectile is associated. For example, in the context of tennis, the movement of the ball may be broken down into a series of "rallies", with each rally representing movement of the ball along various paths between various impacts with one of five objects, namely the first player, the second player, the playing surface on the first player's side, the playing surface on the second player's side, and the net, until the ball goes out of play. Using this analysis, the point of impact of the initial serve will be the initial location, each impact with the ground, with a player's racquet or with the net will represent a redirection space (since the ball will change direction substantially as a result of each such impact), and the point at which the ball comes to rest out of play (or leaves a defined field of play) is the terminal location. (An analogous approach can be applied in respect of other sports.) Thus, each overall rally can be viewed as a series of paths followed by the ball from the initial location to a first redirection space, then between a series of redirection spaces, and ending at the terminal location. This series of paths can be represented within a virtual environment as long as the positions of the initial location, terminal location, and of each redirection space, together with the initial velocity at each such position, are known.

Accordingly, at step 204, the method 200 processes the primary data to generate secondary data. The secondary data represents at least two sets of positions, with each set of positions comprising a start position and an end position. The secondary data further represents a velocity associated with each start position. The velocity associated with each start position can be determined by applying known physics equations because the primary data provides the position of the projectile in three dimensions at various points in time. Moreover, the velocity associated with each start position is determined such that, when the physics engine of a virtual world (such as Second Life) is applied to a virtual object having that velocity at the start position in the set of positions, the virtual object will ultimately arrive at the end position in the set of positions.

At step 206, the method 200 uses the secondary data to simulate movement of the projectile in the virtual environment. In one embodiment, the physics engine for the relevant virtual world will create a virtual projectile at the first start position and impart the associated velocity to that virtual projectile. The virtual projectile will then move along its path to the first end position, which is within a redirection space that also encompasses the start position for the next path of the projectile. In the typical case, the redirection space is a single collision point, and the end position of the current path and the start position for the next path consist of the same point, namely the single collision point. Thus, the sets of positions represented by the secondary data may overlap one another, with a position that is the end position in a first set of positions also being the start position in the next consecutive set of positions. Accordingly, even if the secondary data takes the form of a series of individual collision points with associated velocities, without any explicit segregation into sets, such a series of collision points can still be viewed as a plurality of sets of positions, with the sets overlapping so that the end position in a first set of positions is also the start position in the next consecutive set of positions.

Upon reaching the end position, the first virtual projectile will be destroyed and a new virtual projectile with a new velocity will be created at the new start position (which is typically the same as the end position in the previous set of positions). This new virtual projectile will be given the velocity associated with its start position, and will then move to the next end position, where it too will be destroyed, and a new virtual projectile with a new velocity will be created at the next start position, and so on. Thus, movement of the projectile can be simulated in the virtual environment by, in series, for each consecutive set of positions, creating a new virtual projectile at the start position, with the new virtual projectile having the velocity associated with the start position, and deleting the virtual projectile when it reaches the end position. By creating and then destroying a series of virtual projectiles, each of which follows a path between redirection spaces, the system maintaining the virtual world can create the impression of a single virtual projectile following a long, complex series of trajectories. Moreover, because each start position and velocity represented by the secondary data is derived directly from the primary data, the series of paths followed by the virtual projectiles will generally be a substantially accurate representation of the actual series of trajectories represented by the primary data.

The equations used by virtual world physics engines are typically based on reasonable assumptions (such as that air resistance is zero) to facilitate calculation. However, these assumptions can cause error to accumulate when representing projectile motion in accordance with aspects of the present invention. In many contexts, such as sports, such error is negligible because of the short distances involved, and the resolution of the physics engine may not be sufficiently precise to capture such small errors in any event. Nonetheless, in some cases significant error can occur, or smaller errors might accumulate to a point where they become significant in the aggregate.

Because of the above-described potential for error, there may be slight discrepancies between the exact spatial positions of the end point of a previous path (as determined by the physics engine from the start position and initial velocity) and the start point of the next path (as derived directly from the primary data). One approach to this issue is to generate both the start position and the end position in each set of positions directly and precisely from the primary data, so that the calculated velocity that will be applied by the physics engine to each virtual projectile at its respective start point will cause it to arrive exactly at the end position derived directly from the primary data. With this approach, each end position in a given set of positions will also be the start position in the next set of positions, so that the sets of positions overlap at the redirection space, which consists of a single point as described above (typically this single point is a collision point).

Alternatively, an approach may be used in which no adjustments are made to the initial velocity of the virtual projectile. When using this approach, depending on the resolution of the physics engine, the end position in a first set of positions within the secondary data may not be precisely the same as the start position in the next set of positions within the secondary data, because the end position in the first set of positions may be based on the idealized physics engine, while the start position in the next set of positions is based directly on the primary data. Thus, each position that is the end position in a first set of positions is distinct from the start position in a next consecutive set of positions. In the situation resulting from this approach, the redirection space is a well-defined space (typically significantly smaller than the volume of the virtual projectile itself) which encompasses the spatial positions of both the end point of the previous path and the start point of the next path. Because the previous virtual projectile is destroyed and a new virtual projectile is created in each redirection space, error associated with the idealized nature of the physics engine typically does not accumulate to the point where it would be substantial. More particularly, the new virtual projectile is created not at the end position in the previous set of positions, but at the start position in the next consecutive set of positions, thereby eliminating any accumulated error resulting from the idealized nature of the physics engine. In such instances, the change of direction associated with the redirection space typically assists in concealing from an observer any such inherent correction associated with the destruction of the previous virtual projectile and the creation of the new virtual projectile. Although there may be particular instances in which the end position in a particular set of positions is the same as the start position in the next consecutive set of positions, the end position and the next start position are still distinct from one another in that they are not defined as being the same position.

Moreover, while redirection spaces are typically the result of an impact of the projectile with an object, such as a surface or a player in the sports context, other types of redirection spaces may be used. For example, it may be desired to simulate the movement of a projectile that travels over long distances without colliding with any other objects, such as an aircraft or missile. In such cases where there are no "natural" redirection spaces provided by impacts with other objects, error associated with the idealized nature of a virtual world physics engine may accumulate to the point of significance. In such instances, "artificial" redirection spaces may be used (such as at regular intervals along the path of the virtual projectile) allowing for destruction of the previous virtual projectile and creation of a new virtual projectile (at a correct new start position) so as to inhibit error accumulation. In such an embodiment, such artificial redirection points are preferably sufficiently frequent that individual corrections are small and unobtrusive.

Figure 3:
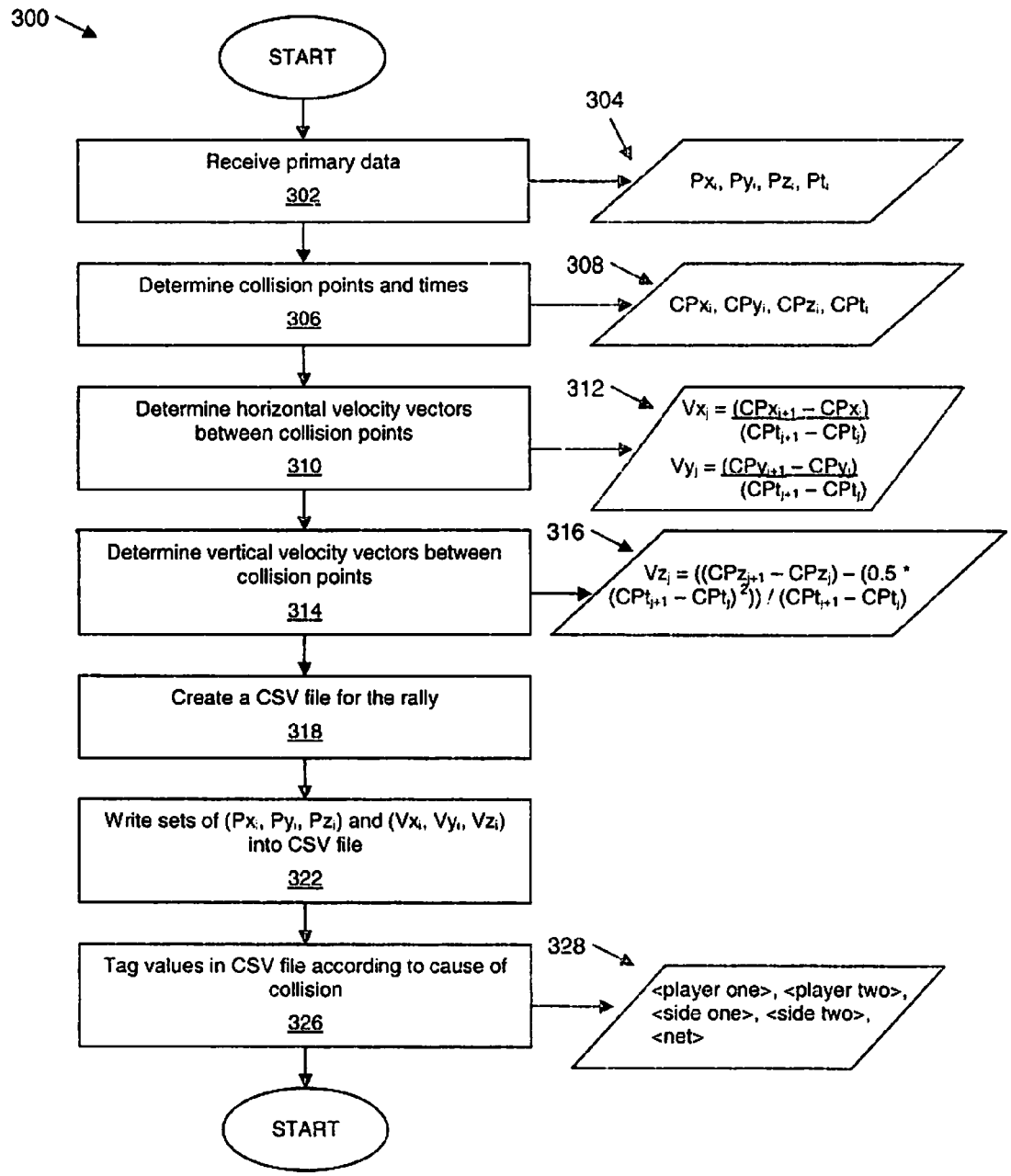
FIG. 3 shows a flowchart representing an exemplary implementation of a first portion of the method of FIG. 2 in respect of the "Second Life" virtual environment.

With reference now to FIG. 3, an exemplary method for processing primary data to generate secondary data is shown generally at 300. The method 300 is a detailed representation of an exemplary implementation of steps 202 and 204 of the method 200 in FIG. 2, applied to generate secondary data suitable for simulating the movement of a tennis ball within the Second Life virtual world.

In the exemplary method 300 shown in FIG. 3, both the start position and the end position in each set of positions is generated directly from the primary data, and the velocity determined for each virtual projectile at its respective start point is that which will cause it to arrive at the end position derived directly from the primary data. As noted above, it is convenient to consider a tennis match in the form of a series of rallies, with each rally considered in terms of a series of "collisions" between the ball and one of five objects, namely, player one, player two, the playing surface on the player one side (surface 1), the playing surface on the player two side (surface 2) and the net. A rally ends when the ball comes to rest, or leaves the area of play. Thus, in the particular exemplary method 300 illustrated in FIG. 3, each redirection space consists of a single collision point CP representing a collision between the tennis ball and one of the five objects. Each collision point $CP_j$ has coordinates ($CPx_j$, $CPy_j$, $CPz_j$) and occurs at time $CPt_j$.

At step 302, the method 300 receives the primary data in the form of position and time data ($Px_i$, $Py_i$, $Pz_i$, $Pt_i$). Thus, the primary data comprises a plurality of sets of position values ($Px_i$, $Py_i$, $Pz_i$) and a plurality of time values $Pt_i$ each associated with one of the sets of position values. In one embodiment, the primary data is received as a primary data stream from the monitoring equipment 16; alternatively, the primary data can be obtained from an alternative source other than the equipment 16. Step 302 corresponds to step 202 of the method 200 illustrated in FIG. 2. The primary data ($Px_i$, $Py_i$, $Pz_i$, $Pt_i$) is indicated in FIG. 3 by the reference numeral 304.

In this embodiment, the server 12 receives only the position and time data relating to respective rallies. Furthermore, when used with Hawk-Eye, the server 12 only receives position and time data per rally. It follows that each primary data stream can be assumed to be that of a respective rally. Thus, when the primary data stream ends, it can be assumed that the rally has ended.

In a further development of this embodiment (not shown), the respective primary data streams can be identified and indexed for post-game viewing and analysis.

At step 306, the method 300 identifies the redirection spaces and associated time values in each rally. As noted above, in this exemplary embodiment, each redirection space consists of a single collision point $CP_j$ whose position is represented by the variables $CPx_j$, $CPy_j$, $CPz_j$, with a time value $CPt_j$, where $CPt_j$ is the time associated with each collision point. In this particular embodiment, at step 306 the server 13 (FIG. 1) identifies a plurality of data sets $CP_j$, indicated in FIG. 3 by the reference numeral 308.

For the purposes of this embodiment, a z-axis is vertical with respect to a playing surface, a y-axis is parallel with a sideline and an x-axis is parallel with a backline, all with respect to the tennis court. Thus, if the z co-ordinate value in the primary data stream decreases to and increases from a particular value for Pz, say zero, representing the playing surface, the ball would have bounced, indicating a collision point. Where the trend in either Px or Py changes direction, the ball would have been struck by a player, or hit the net, also indicating a collision point. Using this information, one skilled in the art, once informed by the herein disclosure, can devise tests for the co-ordinate values to determine a corresponding event on the tennis court. For example, where the Pz value suddenly decreases, while the Py value slows or reverses at a particular value for Py corresponding to the position of the net, the ball would have struck the net. Analogous tests may be developed and used in other sports, and in non-sporting contexts.

In the event that the values for Px, Py and Pz for various positions on the court are not known beforehand, they can readily be determined with suitable deductions from the patterns of values generated during previous usages of the monitoring equipment. Alternatively, such positions can be determined by mapping the initial position of the projectile, either arbitrarily or based on measurement.

At step 310, the method 300 determines the starting horizontal velocity vector components ($Vx_j$, $Vy_j$) at each of the collision points $CP_j$ as explained above. If the x-axis is parallel to the backline of the tennis court, and a y-axis is parallel to a sideline of the tennis court then the velocity vector $Vx_j$ is the solution of the distance along the x-axis between two consecutive collision points divided by the time taken for the ball to travel between the collision points. The velocity vector $Vy_j$ can be calculated in a similar manner using the change of distance along the y-axis. These calculations are as follows:

$$Vx_j=(CPx_{j+1}-CPx_j)/(CPt_{j+1}-CPt_j) \tag{1}$$

$$Vy_j=(CPy_{j+1}-CPy_j)/(CPt_{j+1}-CPt_j) \tag{2}$$

These equations are indicated in FIG. 3 by the reference numeral 312. In one embodiment, the calculations at step 310 are carried out by the server 13.

At step 314, the method 300 determines the vertical velocity vector component between the collision points. In this particular illustrative embodiment, the calculation assumes a constant value "g" for the acceleration due to gravity, and ignores air resistance. Accordingly, the calculation is based on Newtonian equations for a body subject to constant acceleration "a", which provides that a distance "d" traveled in time "t" by such a body traveling at an initial velocity $v_0$ is:

$$d=(v_0*t)+(0.5*a*t^2) \tag{3}$$

The values for "d" and "t" can be determined directly from the position and time values for the collision points, and the acceleration "a" is the value "g" for the acceleration due to gravity. Accordingly, the initial vertical velocity $Vz_j$ for a projectile at a given collision point $CP_j$ is given by:

$$Vz_j=((CPz_{j+1}-CPz_j)-(0.5*(CPt_{j+1}-CPt_j)^2))/(CPt_{j+1}-CPt_j) \quad (4)$$

This equation is indicated in FIG. 3 by the reference numeral 316. In one embodiment, the calculations at step 314 are carried out by the server 13.

At step 318, the method 300 creates a comma-separated value (CSV) file for the rally. At step 322, the method 300 writes the set of position and velocity data components for each collision point in a rally into the respective CSV file. Each two consecutive collision points is a set of positions, with the first collision point in the set being the start position and the second position point being the end position, and the velocity data components for the first collision point therefore represent the velocity of the projectile associated with the start position. It will also be appreciated that in the particular embodiment illustrated in FIG. 3, because a single collision point represents both an end position and the next start position, the end position in a first set of positions is also the start position in the next consecutive set of positions, so that the sets of positions overlap one another by their common positions. In one embodiment, steps 318 and 322 are carried out by the server 13.

At step 326, the method 300 tags each set of values in the respective CSV file according to the cause of the collision that generated the values. The tags, which may in the tennis context be any of <player one>, <player two>, <side one> (for the side on which the player one is located), <side two> (for the side on which the player 2 is located) and <net>, as indicated by the reference numeral 328 in FIG. 3. After step 326, the method 300 ends.

Figure 4:
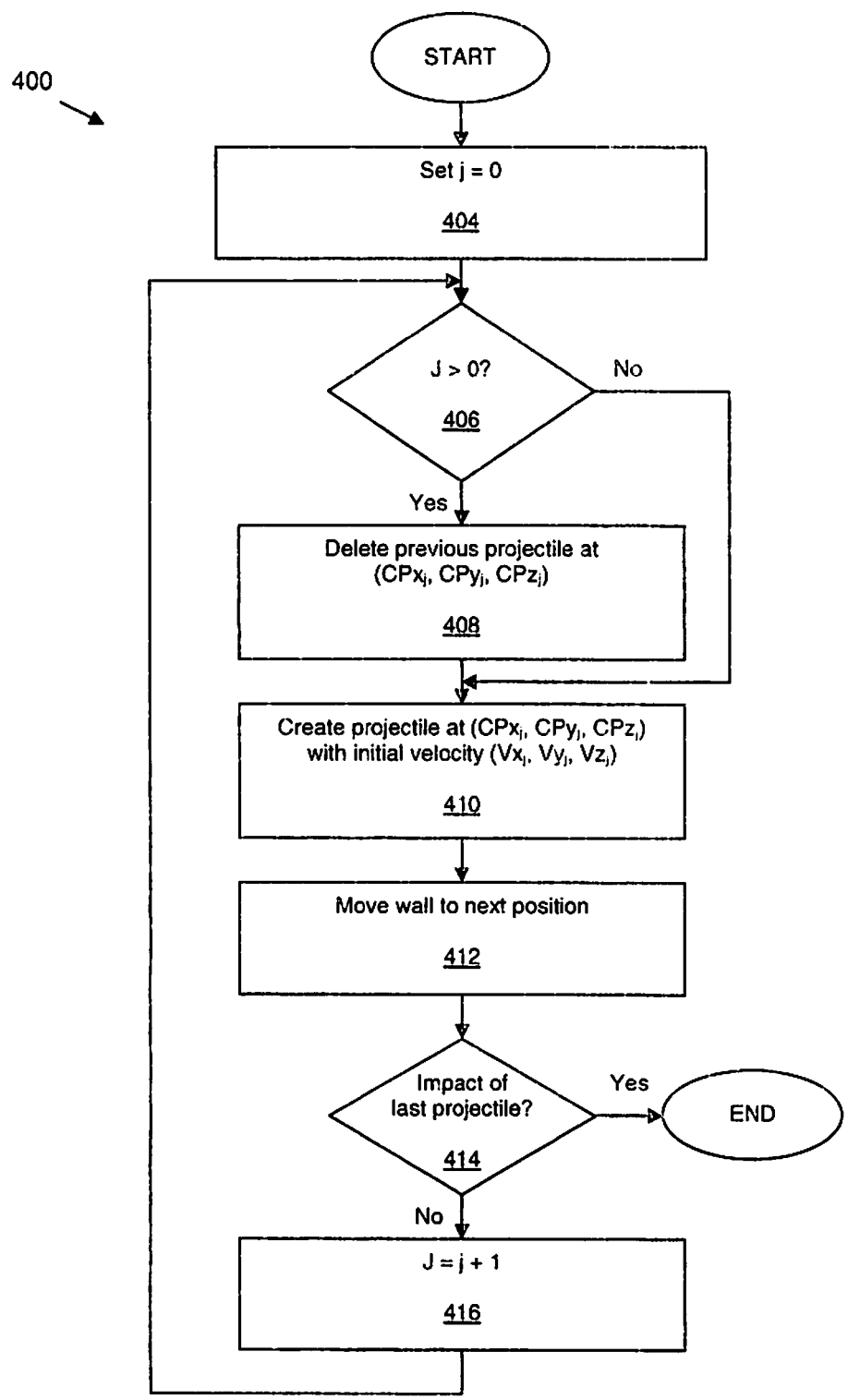
FIG. 4 shows a flowchart representing an exemplary implementation of a second portion of the method of FIG. 2 in respect of the "Second Life" virtual environment.

With reference now to FIG. 4, an exemplary method for using secondary data to simulate movement of a projectile in a virtual environment is shown generally at 400. The method 400 is a detailed representation of an exemplary implementation of step 206 of the method 200 in FIG. 2, applied to simulate movement of a tennis ball within the Second Life virtual environment. The method 400 can be implemented by the simulation server 13, and can be executed at the request of a subscriber at one of the terminals 18 via the Internet in a conventional manner.

At step 404, the method 400 initializes the counter (j) at 0. As will be explained in greater detail below, steps 406 through 416 of the method 400 will, for each consecutive set of positions, create a new virtual projectile at the start position, with the new virtual projectile having the velocity associated with that start position, and delete the virtual projectile when it reaches the end position. In a preferred embodiment, this creating and destroying is done in series, meaning that the new projectile is not created until the previous projectile (if any) has been deleted. However, in some embodiments (not shown) the new virtual projectile may be created at the same time that the previous virtual projectile is destroyed, or a very short period before the previous virtual projectile is destroyed, as long as this does not result in a collision or other interference between the two virtual projectiles, or create the visual appearance of two projectiles at once. In Second Life, for example, creating the next projectile before the previous projectile has been deleted, or at the same time that the previous projectile is deleted, is likely to lead to a collision and should therefore be avoided.

As noted above, in the exemplary tennis context to which the exemplary method 400 is directed, each collision point represents a collision between the ball and one of player one, player two, surface one, surface two, and the net. In Second Life, each of these objects is represented by a virtual wall, with the virtual walls associated with the two players each being movable. Thus, virtual objects, in this case virtual walls, are created in the virtual environment to represent objects with which the virtual projectile collides. In Second Life, the secondary data can be uploaded to the virtual objects for use by a simulation script to render movement of the virtual projectile in the virtual environment. In the particular exemplary embodiment now described, these walls assist in detecting when a virtual projectile has reached the end position in its respective set of positions, because each end position will typically correspond to a collision with one of those walls. In addition, the virtual walls can also be used to create the new virtual projectile once the previous virtual projectile has been deleted. For this latter purpose, the virtual wall does not need to be in the exact location where the new virtual projectile will be generated but merely needs to be nearby. Moreover, in Second Life it is not necessary to use a virtual wall to create the new projectile; however, it is convenient to do so in this embodiment since a virtual wall will be appropriately positioned after detecting the previous virtual projectile. Thus, the use of virtual walls to assist in detecting when a virtual projectile has reached its end position, and in creating new virtual projectiles, is a specific adaptation to facilitate application of the invention to Second Life. Such uses of virtual walls may be omitted if sufficiently fast processing is available to enable the determination that a virtual projectile has reached its end position to be made directly without undue time lag.

As noted above, at step 404 the counter (j) is initialized to zero. At step 406, the method 400 checks whether the value of the counter (j) is greater than 0. If the response is negative, this indicates that j=0 and the first virtual projectile has yet to be created, in which case the method 400 bypasses step 408 and proceeds to step 410 to create the first virtual projectile at coordinates $(CPx_0, CPy_0, CPz_0)$ with an initial velocity represented by components $(Vx_0, Vy_0, Vz_0)$. If the response at step 406 is positive, this indicates that at least one previous virtual projectile has been created, so the method 400 proceeds to step 408 to delete the previous virtual projectile (which collided with one of the virtual walls at coordinates $(CPx_j, CPy_j, CPz_j)$, since in this embodiment the end position of the previous virtual projectile is identical to the start position of the next virtual projectile). The method 400 then proceeds from step 408 to step 410, at which the method 400 creates the next virtual projectile at coordinates $(CPx_j, CPy_j, CPz_j)$ with an initial velocity represented by $(Vx_j, Vy_j, Vz_j)$. At step 412, the position of the wall which created the new virtual projectile at step 410 is moved to its next position, so that it will be in place to intercept and detect the next virtual projectile that will collide with it. Only the walls associated with player one and player two are moved, so if the virtual wall that created the new virtual projectile at step 410 is the net or is one of the two playing surfaces, step 412 will be omitted for that iteration. Moreover, it is to be appreciated that where one of the player virtual walls is moved at step 412, it is the player virtual wall that created the new virtual projectile at step 410, and not the player virtual wall that will receive that newly created projectile, that is moved at step 412. If a player virtual wall will receive the newly created projectile, that player virtual wall will have already been moved at a step 412 of a previous iteration, or will already be in the appropriate initial position when the method 400 begins. The determination as to which virtual wall will receive the current projectile can be made using the tags applied to the relevant collision point in the relevant CSV file.

At step 414, the method 400 detects the virtual collision of the virtual projectile created at step 410 and checks whether that virtual projectile is the last virtual projectile in the rally. If so, the method 400 ends. If the virtual projectile that just collided is not the last projectile, the method 400 increments the counter (j) at step 416 and returns to step 406.

According to an aspect of the present invention, a user may view a substantially accurate recreation of a real sporting event in a three-dimensional immersive environment. This allows viewers to use existing technology provided by virtual world applications such as Second Life to view the reconstructed game from the point of view of an avatar. As is known, such avatars can move about a virtual environment in practically any direction. Furthermore, using the simulation script and the relevant tagged data in an appropriate CSV file, in Second Life a user's avatar can be associated with one of the virtual walls representing a player so that they are very close to that virtual wall and will move with that virtual wall. It should be noted here that the movement of the virtual wall representing a player (and therefore the movement of the avatar) will not be exactly the same as the movement of the real player in the real world; however, since the players would be expected to move from position to position in a generally straight line, the movement of the wall representing the player should in most instances provide a reasonably good approximation of the player's movement. Accordingly, a user or subscriber can view certain sporting events from a point of view that is generally similar to the point of view of one of the players. Alternatively, if sufficient information is available, a player may be treated as a projectile, and movement of the player may be then simulated according to aspects of the present invention, with the user's avatar associated with the moving projectile representing the player.

Furthermore, because of the range of movement of an avatar, it is possible to view the game from any position on the tennis court, for example, from an edge of a net or from an umpire's point of view while the simulation is in progress.

Figure 5:
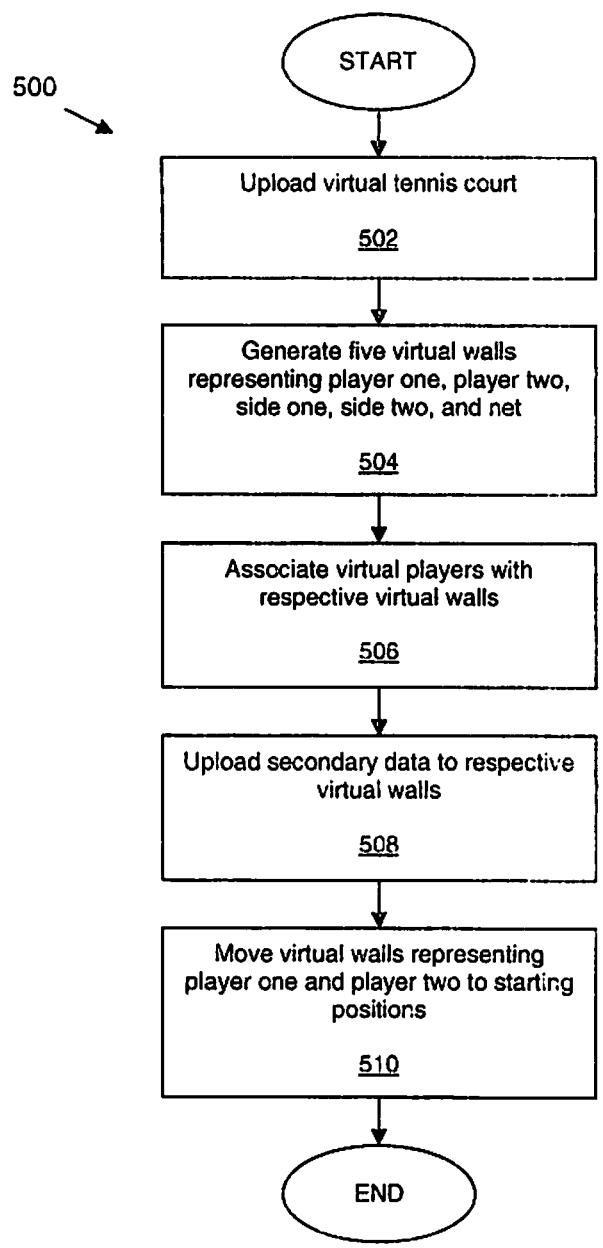
FIG. 5 shows a flowchart representing an exemplary method for preparing a "Second Life" virtual environment prior to rendering a simulation of projectile movement therein.

In FIG. 5, reference numeral 500 generally indicates a method for setting up a virtual tennis court for rendering in the virtual environment, in particular within Second Life, according to an aspect of the present invention. It will be appreciated that analogous methods, with suitable adaptations, may be used to set up other virtual playing fields in Second Life or in other virtual environments. Additionally, while doing so will generally enhance a user's experience, it is not strictly necessary to generate a virtual playing field or similar virtual location in order to apply aspects of the present invention. For example, a tennis match can be simulated, in accordance with an aspect of the present invention, within a virtual desert, and movement of the simulated projectile will be substantially accurate relative to some arbitrary origin point. Of course, the local virtual environment in which the virtual projectile will move should be free of objects that will interfere with the projectile's paths (which are known in advance). For example, a simulation of a tennis match in the virtual desert should be far enough away from any virtual cacti that the virtual ball will not collide therewith.

At step 502, the method 500 uploads a virtual tennis court to the simulation script which, in this embodiment, is running on the server 13. The virtual tennis court may be predefined, dynamically generated based on previously defined parameters, or may be entirely dynamically generated.

At step 504, the method 500 generates five virtual walls and associates them with the virtual tennis court. One of the walls represents player one, another one of the walls represents player two, another one of the walls represents the surface on the player one side (side one), another one of the walls represents the surface on the player two side (side two), and another one of the walls represents the net. In this embodiment, all of the virtual walls are invisible.

At step 506, the method 500 associates the virtual players with their respective virtual walls, and positions the virtual players in a realistic position with respect to their respective walls, that is, where the virtual players could be expected to be when striking or receiving the ball.

At step 508, the method 500 uses the Second Life inter-object communication protocol to upload the relevant secondary data (i.e. the relevant position values and velocity values) to the respective virtual walls to facilitate detection of impact of virtual projectiles, and creation of new virtual projectiles. As noted above, this process may be facilitated by tags in the CSV files.

At step 510, the method 500 moves the virtual walls representing player one and player two to their respective starting positions ($CPx_j$, $CPy_j$, $CPz_j$), after which the method 500 ends.

It is to be understood that the present invention, in accordance with at least one presently preferred embodiment, includes a system for simulating a projectile-based activity in a virtual environment, a method for simulating a projectile-based activity in a virtual environment, and a computer program product comprising at least one computer-readable medium containing computer-usable instructions for simulating a projectile-based activity in a virtual environment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention have been illustrated by way of particular exemplary embodiments, namely the system 10 and methods 300, 400 and 500, which are directed in particular to the simulation of at least part of a tennis match in the Second Life virtual world. These exemplary embodiments are provided for illustrative purposes only, and are not intended to limit the scope of the invention in any way. The present invention is not limited to Second Life, or to tennis (or even to sporting events generally). Accordingly, aspects of the present invention may be applied to simulate virtually any kind of projectile motion in any suitable virtual environment having a suitable vector-based physics engine. In addition, while particular physics equations have been used for illustrative purposes, other accurate physics equations (for example, equations accounting for air resistance) may also be used. Moreover, although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A data processing system for simulating projectile movement in a virtual environment, the data processing system comprising a bus system; a communications unit coupled to the bus system; a memory coupled to the bus system, wherein the memory includes a set of instructions; and a processing unit coupled to the bus system, wherein the processing unit is operable to cause execution of the set of instructions to perform the following steps:

receive primary data comprising a plurality of sets of position values and a plurality of time values corresponding to a path of a projectile, each time value being associated with a respective one of the sets of position values;

process the primary data to generate secondary data, wherein the secondary data represents a plurality of sets of positions, each set of positions representing a respective portion of a plurality of consecutive portions of said path of said projectile, each said set of positions comprising a respective start position and a respective end position for the corresponding portion of said path of said projectile, and wherein the secondary data further represents a respective velocity of the projectile associated with each said start position;

provide the secondary data to a virtual platform having a physics engine which supports a computer-based immersive virtual environment; and generate visual output to a user simulating an event in the computer-based immersive virtual environment using the virtual platform, wherein the secondary data is used by the physics engine to simulate said path of said projectile in the computer-based immersive virtual environment by successively generating with the physics engine a respective trajectory representing each consecutive portion of said path of said projectile using the corresponding start position and velocity associated with the corresponding start position to reach a respective end position of the respective portion of said path of said projectile, and adjusting the position and velocity of the projectile to correspond to the start position and velocity of the immediately succeeding consecutive portion of said path of said projectile, wherein for at least a first portion of said path of said projectile, the respective end position of the first portion does not correspond to the respective start position of the portion of said path of said projectile immediately succeeding the first portion.

2. The data processing system of claim 1, wherein the data processing system is configured to receive the primary data from a monitoring system in a real world environment.

3. The data processing system of claim 1, wherein the processing unit is operable to cause execution of the set of instructions to process the primary data by determining redirection spaces for the projectile.

4. The data processing system of claim 3, wherein each redirection space consists of a single collision point at which a direction of the projectile changes to an extent that indicates a collision of the projectile with an object.

5. The data processing system of claim 4, wherein the processing unit is operable to cause execution of the set of instructions to calculate velocity vectors between consecutive collision points to generate the secondary data.

6. The data processing system of claim 1, wherein generating visual output to a user simulating an event in the computer-based immersive virtual environment using the virtual platform, wherein the secondary data is used to simulate movement of the projectile in the computer-based immersive virtual environment, comprises, in series, for each consecutive set of positions:

creating a new virtual projectile at the start position in the virtual environment, the new virtual projectile having the velocity associated with the start position; and deleting the new virtual projectile when it reaches the end position in the virtual environment.

7. A method of simulating movement of a projectile in a virtual environment, the method comprising the computer-executed steps of:

receiving primary data comprising a plurality of sets of position values and a plurality of time values corresponding to a path of a projectile, each time value being associated with a respective one of the sets of position values;

processing the primary data to generate secondary data, wherein the secondary data represents a plurality of sets of positions, each set of positions representing a respective portion of a plurality of consecutive portions of said path of said projectile, each said set of positions comprising a respective start position and a respective end position for the corresponding portion of said path of said projectile, and wherein the secondary data further represents a respective velocity of the projectile associated with each said start position;

providing the secondary data to a virtual platform having a physics engine which supports a computer-based immersive virtual environment; and generating visual output to a user simulating an event in the computer-based immersive virtual environment using the virtual platform, wherein the secondary data is used by the physics engine to simulate said path of said projectile in the computer-based immersive virtual environment by successively generating with the physics engine a respective trajectory representing each consecutive portion of said path of said projectile using the corresponding start position and velocity associated with the corresponding start position to reach a respective end position of the respective portion of said path of said projectile, and adjusting the position and velocity of the projectile to correspond to the start position and velocity of the immediately succeeding consecutive portion of said path of said projectile, wherein for at least a first portion of said path of said projectile, the respective end position of the first portion does not correspond to the respective start position of the portion of said path of said projectile immediately succeeding the first portion.

8. The method of claim 7, wherein receiving the primary data comprises receiving the primary data from a monitoring system in a real world environment.

9. The method of claim 7, wherein processing the primary data to generate the secondary data comprises determining redirection spaces for the projectile.

10. The method of claim 9, wherein each redirection space consists of a single collision point at which a direction of the projectile changes to an extent that indicates a collision of the projectile with an object.

11. The method of claim 10, wherein processing the primary data to generate the secondary data comprises calculating velocity vectors between consecutive collision points.

12. The method of claim 7, wherein generating visual output to a user simulating an event in the computer-based immersive virtual environment using the virtual platform, wherein the secondary data is used to simulate movement of the projectile in the computer-based immersive virtual environment, comprises, in series, for each consecutive set of positions:
creating a new virtual projectile at the start position in the virtual environment, the new virtual projectile having the velocity associated with the start position; and
deleting the new virtual projectile when it reaches the end position in the virtual environment.

13. A computer program product comprising at least one non-transitory computer-readable medium containing computer-usable instructions for simulating movement of a projectile in a virtual environment, wherein the computer-usable instructions, when executed by a computer, cause the computer to:
receive primary data comprising a plurality of sets of position values and a plurality of time values corresponding to a path of a projectile, each time value being associated with a respective one of the sets of position values;
process the primary data to generate secondary data, wherein the secondary data represents a plurality of sets of positions, each set of positions representing a respective portion of a plurality of consecutive portions of said path of said projectile, each said set of positions comprising a respective start position and a respective end position for the corresponding portion of said path of said projectile, and wherein the secondary data further represents a respective velocity of the projectile associated with each said start position;
provide the secondary data to a virtual platform having a physics engine which supports a computer-based immersive virtual environment; and
generate visual output to a user simulating an event in the computer-based immersive virtual environment using the virtual platform, wherein the secondary data is used by the physics engine to simulate said path of said projectile in the computer-based immersive virtual environment by successively generating with the physics engine a respective trajectory representing each consecutive portion of said path of said projectile using the corresponding start position and velocity associated with the corresponding start position to reach a respective end position of the respective portion of said path of said projectile, and adjusting the position and velocity of the projectile to correspond to the start position and velocity of the immediately succeeding consecutive portion of said path of said projectile, wherein for at least a first portion of said path of said projectile, the respective end position of the first portion does not correspond to the respective start position of the portion of said path of said projectile immediately succeeding the first portion.

14. A computer program product as claimed in claim 13, wherein the computer-usable instructions, when executed by a computer, cause the computer to receive the primary data from a monitoring system in a real world environment.

15. A computer program product as claimed in claim 14, wherein the computer-usable instructions, when executed by a computer, cause the computer to determine redirection spaces for the projectile.

16. The computer program product as claimed in claim 15, wherein each redirection space consists of a single collision point at which a direction of the projectile changes to an extent that indicates a collision of the projectile with an object.

17. A computer program product as claimed in claim 16, wherein the computer-usable instructions, when executed by a computer, cause the computer to calculate velocity vectors between consecutive collision points as part of generating the secondary data.

18. A method for simulating projectile movement in a virtual environment, the method comprising computer-executed steps of:
obtaining data representing a plurality of sets of positions, each set of positions representing a respective portion of a plurality of consecutive portions of a path of a projectile, each said set of positions comprising a respective start position and a respective end position for said projectile, the data further representing a respective velocity of the projectile associated with each said start position; and
using the data to simulate said path of the projectile in a computer-based immersive virtual environment generated by a virtual platform having a physics engine by, in series, for each consecutive set of positions:
(a) creating a new virtual projectile at the respective start position, the new virtual projectile having the velocity associated with the respective start position;
(b) using the physics engine to determine a respective trajectory from the respective start position and velocity associated with the respective start position to reach a respective end position; and
(c) deleting the new virtual projectile when it reaches the respective end position, wherein for at least a first virtual projectile, the respective end position of the first virtual projectile does not correspond to the respective start position of the virtual projectile immediately succeeding the first virtual projectile; and
generating visual output to a user simulating an event in the computer-based immersive virtual environment using the virtual platform, wherein the movement of the projectile is part of the event.

19. A computer program product comprising at least one non-transitory computer-readable medium containing computer-usable instructions for simulating movement of a projectile in a virtual environment, wherein the computer-usable instructions, when executed by a computer, cause the computer to:
obtain data representing a plurality of sets of positions, each set of positions representing a respective portion of a plurality of consecutive portions of a path of a projectile, each said set of positions comprising a respective start position and a respective end position for said projectile, the data further representing a respective velocity of the projectile associated with each said start position; and use the data to simulate said path of the projectile in a computer-based immersive virtual environment generated by a virtual platform having a physics engine by, in series, for each consecutive set of positions:

(a) creating a new virtual projectile at the respective start position, the new virtual projectile having the velocity associated with the respective start position;

(b) using the physics engine to determine a respective trajectory from the respective start position and velocity associated with the respective start position to reach a respective end position; and (c) deleting the new virtual projectile when it reaches the respective end position, wherein for at least a first virtual projectile, the respective end position of the first virtual projectile does not correspond to the respective start position of the virtual projectile immediately succeeding the first virtual projectile; and generate visual output to a user simulating an event in the computer-based immersive virtual environment using the virtual platform, wherein the movement of the projectile is part of the event.

\* \* \* \* \*